(12) United States Patent
Yoshino

(10) Patent No.: US 11,223,738 B2
(45) Date of Patent: Jan. 11, 2022

(54) IMAGE FORMING APPARATUS INCLUDING CONNECTOR THAT IS MOVABLE BETWEEN TWO POSITIONS

(71) Applicant: CANON KABUSHIKI KAISHA, Tokyo (JP)

(72) Inventor: Daiju Yoshino, Toride (JP)

(73) Assignee: Canon Kabushiki Kaisha, Tokyo (JP)

(\*) Notice: Subject to any disclaimer, the term of this patent is extended or adjusted under 35 U.S.C. 154(b) by 0 days.

(21) Appl. No.: 16/850,072

(22) Filed: Apr. 16, 2020

(65) Prior Publication Data

US 2020/0336617 A1    Oct. 22, 2020

(30) Foreign Application Priority Data

Apr. 16, 2019    (JP) .............................. JP2019-077617

(51) Int. Cl.
  *H04N 1/00*    (2006.01)
(52) U.S. Cl.
  CPC .............................. *H04N 1/00965* (2013.01)
(58) Field of Classification Search
  None
  See application file for complete search history.

(56) References Cited

U.S. PATENT DOCUMENTS

| | | | | |
|---|---|---|---|---|
| 6,503,102 B1* | 1/2003 | Zhang | .................. | H01R 13/506 439/607.01 |
| 7,280,854 B2* | 10/2007 | Sugawara | ............. | G06F 1/1632 345/168 |
| 7,705,873 B2* | 4/2010 | Kuse | .................. | G03G 21/1652 347/263 |
| 7,719,824 B2* | 5/2010 | Tanaka | .................. | G06F 1/1656 361/679.01 |
| 2010/0281185 A1* | 11/2010 | Takayama | ............. | G06F 1/3278 710/14 |
| 2016/0380372 A1* | 12/2016 | Hsieh | ................. | H01R 13/2442 439/676 |
| 2017/0364015 A1 | 12/2017 | Yoshino | | |
| 2020/0249888 A1* | 8/2020 | Kurita | ................ | H04N 1/00411 |

FOREIGN PATENT DOCUMENTS

JP    2017-205875 A    11/2017

\* cited by examiner

*Primary Examiner* — Paul F Payer

(74) *Attorney, Agent, or Firm* — Venable LLP

(57) ABSTRACT

Disclosed is an image forming apparatus, including: a connector having a connecting portion to which a USB memory is attachable; a support member configured to support the connector, the support member having a screw hole; a first screw hole provided on a main body of the image forming apparatus correspondingly to the screw hole of the support member, the first screw hole being for fixing the connector at a first position where the connecting portion of the connector is exposed from an exterior cover of the main body; and a second screw hole provided on the main body correspondingly to the screw hole of the support member, the second screw hole being for fixing the connector at a second position where the connecting portion of the connector is located inside the exterior cover.

6 Claims, 16 Drawing Sheets

IMAGE FORMING APPARATUS INCLUDING CONNECTOR THAT IS MOVABLE BETWEEN TWO POSITIONS

BACKGROUND OF THE INVENTION

Field of the Invention

The present invention relates to an image forming apparatus such as an electrophotographic copying machine and an electrophotographic printer (for example, a laser beam printer, an LED printer, etc.).

Description of the Related Art

The configuration of an image forming apparatus having a connector with a connecting portion to which a USB memory can be connected is known. As Japanese Patent Application Laid-Open No. 2017-205875 discloses, a user can easily attach and detach a USB memory by providing a connector such that a connecting portion is exposed from the exterior cover of the main body of the image forming apparatus. A user connects a USB memory to the connecting portion of the connector in order to take in image data stored in the USB memory into the main body of the image forming apparatus.

An IC card reader for reading a user's IC card information to authenticate an individual and a numerical keypad for inputting numerical information may be optionally added to the image forming apparatus according to a user's request. The electrical connection between the IC card reader or the numerical keypad and the main body of the image forming apparatus is performed, for example, by connecting a USB plug of the IC card reader or of the numerical keypad to the connector of the main body.

The IC card reader or the numerical keypad is less frequently removed than the USB memory. Therefore, it is not necessary to expose the connecting portion of the connector to which the USB plug is connected from the exterior cover of the main body, and rather, it is preferable to arrange the connecting portion inside the exterior cover of the main body from the viewpoint of the appearance and the treatment of cables.

However, the provision of the connector for connecting an IC card reader or a numerical keypad inside the exterior cover in addition to the connector whose connecting portion is provided at a position where the connecting portion is exposed from the exterior cover of the apparatus body leads to an increase in the manufacturing cost of the image forming apparatus since a plurality of connectors must be provided.

SUMMARY OF THE INVENTION

An object of the present invention is to provide an image forming apparatus in which a connector whose connecting portion is provided at a position where the connecting portion is exposed from the exterior cover of the main body of the apparatus can be easily reused.

A representative configuration of the present invention is an image forming apparatus, comprising: a connector having a connecting portion to which a USB memory is attachable; a support member configured to support the connector, the support member having a screw hole; a first screw hole provided on a main body of the image forming apparatus correspondingly to the screw hole of the support member, the first screw hole being for fixing the connector at a first position where the connecting portion of the connector is exposed from an exterior cover of the main body; and a second screw hole provided on the main body correspondingly to the screw hole of the support member, the second screw hole being for fixing the connector at a second position where the connecting portion of the connector is located inside the exterior cover.

Further features of the present invention will become apparent from the following description of exemplary embodiments with reference to the attached drawings.

DESCRIPTION OF THE EMBODIMENTS

First Embodiment

<Image Forming Apparatus>

Hereinafter, the overall configuration of an image forming apparatus according to the first embodiment of the present invention will be described together with operations during image formation with reference to the drawings. The size, the material, the shape, and the relative arrangement of the components described below are not intended to limit the scope of the invention unless otherwise specifically noted.

The image forming apparatus A according to the present embodiment is of an intermediate tandem type in which four color toners of yellow Y, magenta M, cyan C and black K are transferred to an intermediate transfer belt, and then an image is transferred to a sheet to form an image. In the following description, the suffixes Y, M, C and K are respectively added to the members for the toners of the above colors. However, the configuration and the operation of a member for one color are substantially the same as those for other colors except the color of the toner to be used is different. Thus, these suffixes will be omitted as appropriate unless necessary to distinguish them.

Figure 1:
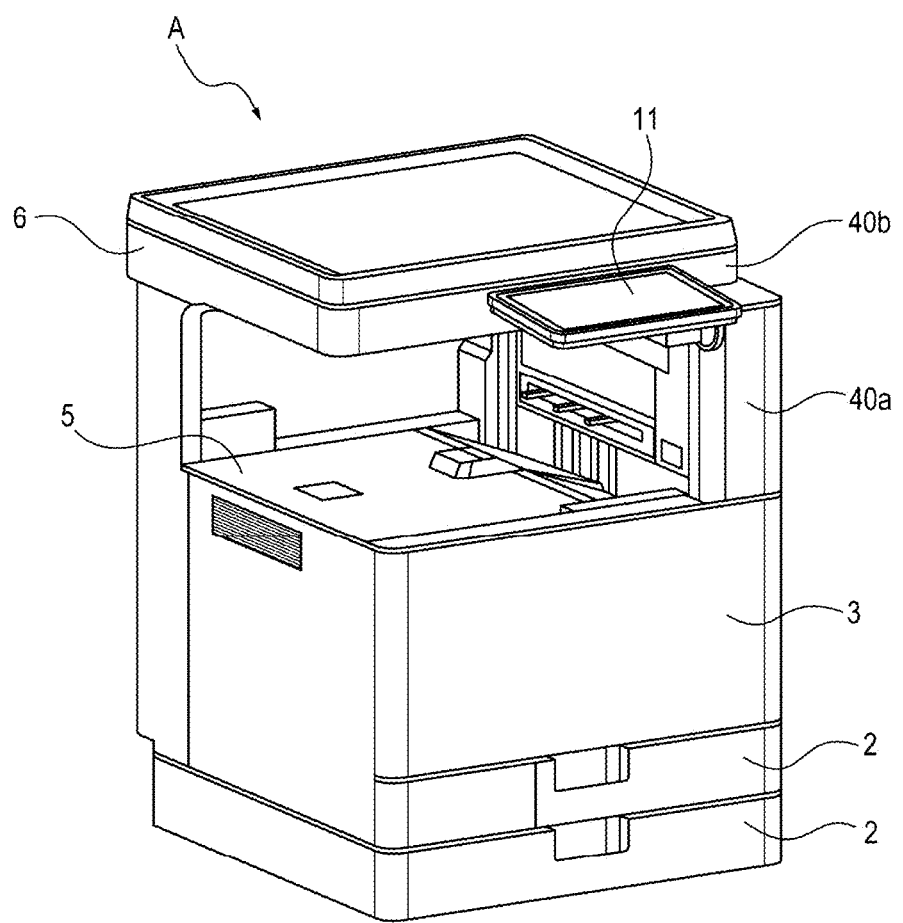
FIG. 1 is a schematic perspective view of an image forming apparatus.
Figure 2:
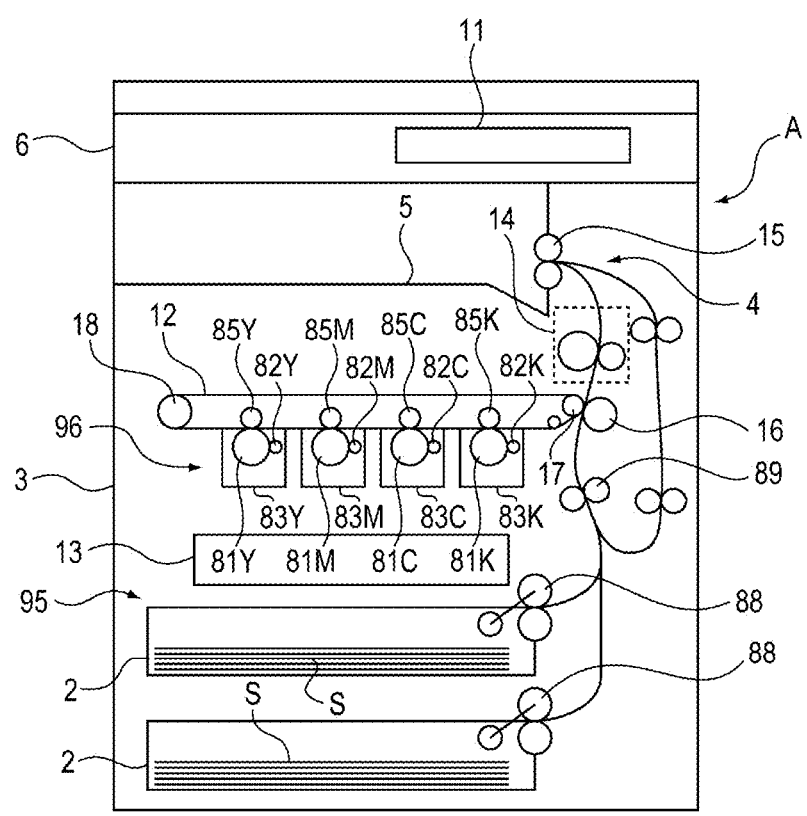
FIG. 2 is a schematic cross-sectional view of an image forming apparatus.

FIG. 1 is a schematic perspective view of the image forming apparatus A. FIG. 2 is a schematic cross-sectional view of the image forming apparatus A. As shown in FIGS. 1 and 2, the image forming apparatus A includes the image forming portion 96 that forms an image by transferring a toner image to a sheet, the sheet feeding portion 95 that feeds a sheet to the image forming portion, and the fixing device 14 working as a fixing portion for fixing the toner image on the sheet.

The image forming portion 96 includes the photosensitive drums 81 (81Y, 81M, 81C and 81K), the charging rollers 82 (82Y, 82M, 82C and 82K), and the developing devices 83 (83Y, 83M, 83C and 83K), the primary transfer rollers 85 (85Y, 85M, 85C and 85K), the laser scanner unit 13, the intermediate transfer belt 12, the secondary transfer roller 16, the secondary transfer opposing roller 17 and the drive roller 18.

The image reading device 6, which is a flatbed scanner for reading an image of a document is provided at an upper portion of the image forming apparatus A. The image reading device 6 is rotatably supported, and a user can place a document on a reading surface (not shown) after rotating the image reading device 6 upward. The image reading device 6 optically reads an image on a document placed on the reading surface and converts the image into image data.

The touch panel type operation portion 11 is rotatably supported at an upper portion of the main body 3 of the image forming apparatus A. Keys for inputting numbers can be displayed in a predetermined area on the operation portion 11, and numerical information is input when a user presses the displayed keys. As described above, a user operates the operation portion 11 to input numbers, thereby performing settings related to image formation such as the type of the sheet S, the output size of images, and the number of sheets on which an image is formed.

Next, an image forming operation performed by the image forming apparatus A will be described. First, when an image forming job signal is input to the controlling portion 70 shown in FIG. 3, the sheets S stacked and stored in the sheet cassette 2 are fed to the registration roller 89 by the feed roller 88. Next, the sheet S is conveyed by the registration roller 89 to the secondary transfer portion formed by the secondary transfer roller 16 and the secondary transfer opposing roller 17 at a predetermined timing.

Meanwhile, in the image forming portion, the surface of the photosensitive drum 81Y is first charged by the charging roller 82Y. Thereafter, the laser scanner unit 13 irradiates the surface of the photosensitive drum 81Y with laser light in accordance with an image signal transmitted from an external device (not shown) or the like to form an electrostatic latent image on the surface of the photosensitive drum 81Y.

Thereafter, yellow toner is attached to the electrostatic latent image formed on the surface of the photosensitive drum 81Y by the developing device 83Y to form a yellow toner image on the surface of the photosensitive drum 81Y. The toner image formed on the surface of the photosensitive drum 81Y is primarily transferred to the intermediate transfer belt 12 by applying a primary transfer bias to the primary transfer roller 85Y.

By the same process, magenta, cyan and black toner images are respectively formed on the photosensitive drums 81M, 81C and 81K. Then, by applying a primary transfer bias to the primary transfer rollers 85M, 85C and 85K, these toner images are overlappingly transferred onto the yellow toner image on the intermediate transfer belt 12. As a result, a full-color toner image is formed on the surface of the intermediate transfer belt 12.

Thereafter, the full-color toner image is sent to the secondary transfer unit by the intermediate transfer belt 12 which is rotated by a driving force of the driving roller 18. Then, the full-color toner image on the intermediate transfer belt 12 is transferred to the sheet S by applying a secondary transfer bias to the secondary transfer roller 16 at the secondary transfer portion.

Next, the sheet S to which the toner image has been transferred is heated and pressed at the fixing device 14 so that the toner image on the sheet S is fixed to the sheet S. Thereafter, the sheet S on which the toner image is fixed is conveyed to the discharge roller 15 via the vertical path portion 4 and discharged to the discharge portion 5 by the discharging roller 15. The vertical path portion 4 is covered with the exterior cover 40a.

<Controlling Portion>

Next, an outline of a system configuration of the image forming apparatus A will be described.

Figure 3:
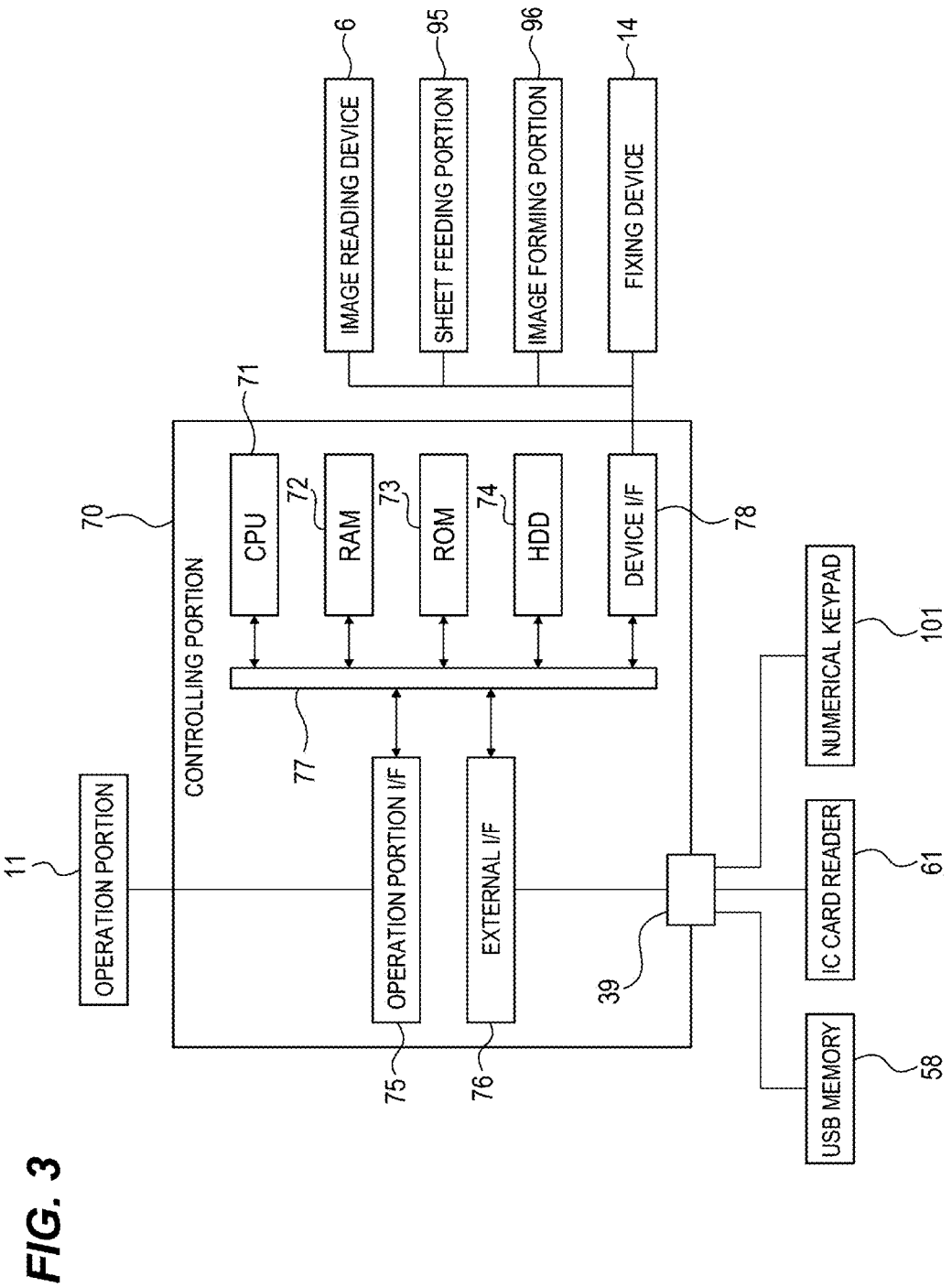
FIG. 3 is a block diagram showing a part of the system configuration of an image forming apparatus.

FIG. 3 is a block diagram illustrating a part of the system configuration of the image forming apparatus A. As shown in FIG. 3, the image forming apparatus A includes the controlling portion 70 having the CPU 71, the ROM 72, the RAM 73 and the HDD 74. These components are all connected to the system bus 77.

In the ROM 72 and the HDD 74, various data such as control programs and tables are stored. The CPU 71 performs various arithmetic processes based on the control programs and information stored in the ROM 72 and the HDD 74. The RAM 73 temporarily stores data.

That is, in the controlling portion 70, the CPU 71 controls the devices connected via the device input/output circuit (I/F) 78 while using the RAM 73 as a working area based on the control programs stored in the ROM 72 and the HDD 74. The above-described image forming operation is executed through the control of these devices.

The operation portion 11 is connected to the operation portion input/output circuit (I/F) 75 of the controlling portion 70. The controlling portion 70 receives signals from the operation portion 11 and operates various devices of the image forming apparatus A. Further, various information is displayed on the operation portion 11 under the control of the controlling portion 70.

The controlling portion 70 has the external input/output circuit (I/F) 76. As will be described later, the USB memory 58, the numerical keypad 101, the IC card reader 61, and the like are connected to the external input/output circuit (I/F) 76 via the connector 39 of the main body 3 of the image forming apparatus A. The input information from the numerical keypad 101 may be displayed on the operation portion 11 under the control of the controlling portion 70.

<Connector>

The image forming apparatus A is provided with the connector 39 having the USB port 39a (connection portion) to which the USB memory 58 or the like can be connected. Next, the configuration of the connector 39 will be described.

Figure 4:
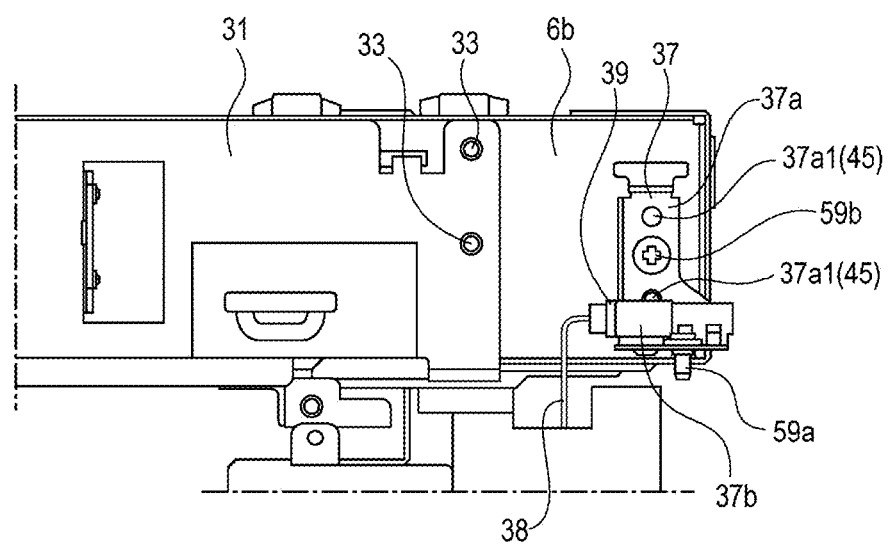
FIG. 4 is a plan view showing the connector and the surrounding thereof when the connector is fixed at an outer position.
Figure 5:
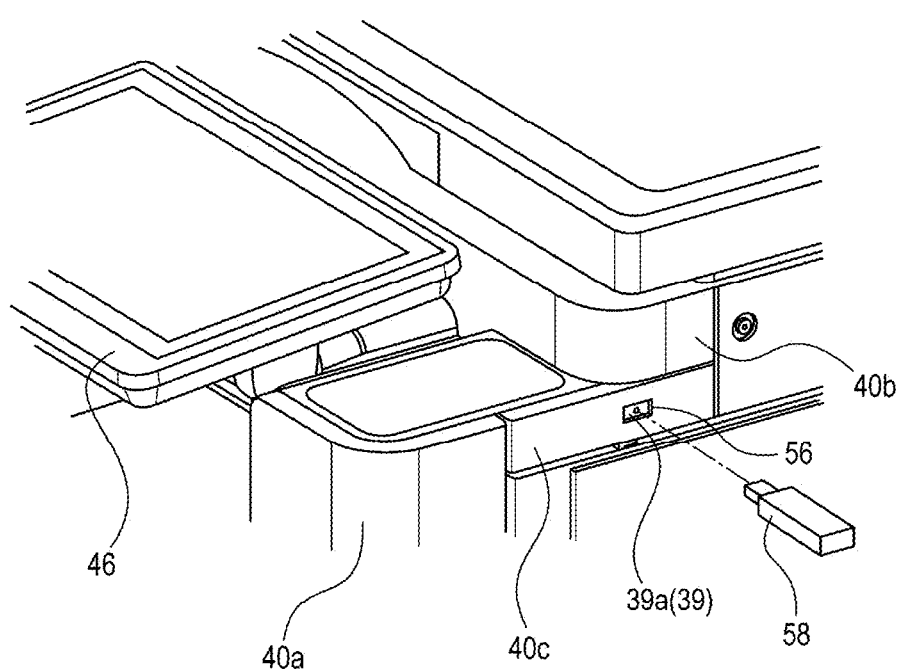
FIG. 5 is a perspective view of the connector and the surrounding thereof when the connector is fixed at an outer position.
Figure 6A:
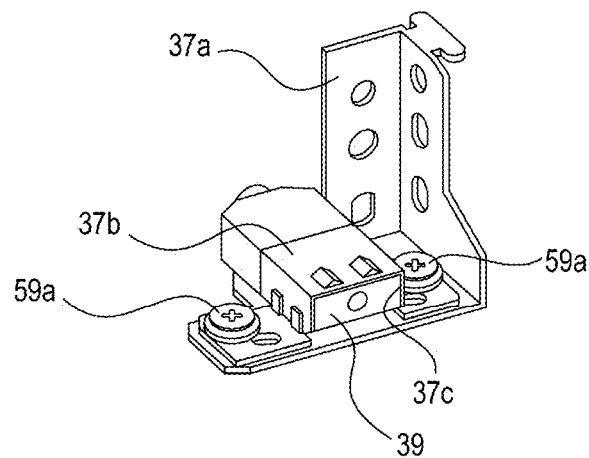
FIGS. 6A and 6B are perspective views of a support member.
Figure 6B:
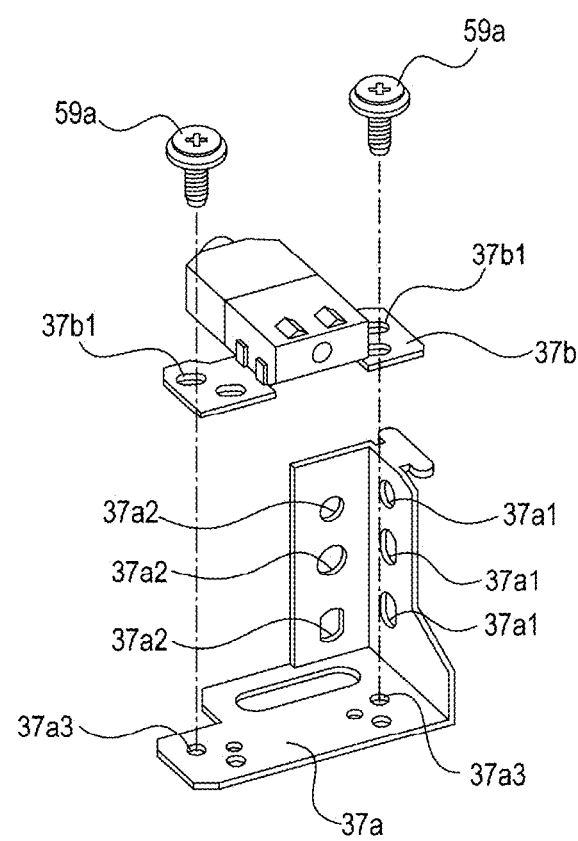

FIGS. 4 and 5 are respectively a plan view and a perspective view, showing the connector 39 and the surrounding thereof in the case where the connector 39 is fixed to the outer position (first position) where the USB port 39a of the connector 39 is exposed from the exterior cover 40c of the main body 3. FIGS. 6A and 6B are perspective views of the support member 37 that supports the connector 39. FIG. 5 is a view showing the case where the exterior covers 40a, 40b and 40c are attached with the connector 39 fixed at the outer position.

As shown in FIG. 4, when the connector 39 is fixed at the outer position, the connector 39 is attached to the front side frame body 6b of the image reading device 6 via the support member 37. In this embodiment, although the connector 39 is fixed to the frame body 6b of the image reading device 6, the connector 39 may be fixed to the frame of the main body 3 or to a member fixed to the frame of the main body 3.

As shown in FIGS. 6A and 6B, the support member 37 includes the pedestal portion 37a formed by connecting a plurality of surfaces having different angles, and the square U-shaped portion 37b. The connector 39 is fitted into the rectangular hole 37c formed by the pedestal portion 37a and the square U-shaped portion 37b of the support member 37. With the connector 39 fitted in the rectangular hole 37c, after the screws 59a are inserted into the screw holes 37b1 of the square U-shaped portion 37b and the screw holes 37a3 of the pedestal portion 37a and the screws 59a, the pedestal portion 37a and the square U-shaped portion 37b are fastened to each other. As a result, the connector 39 is fixed to the support member 37 and supported by the support member 37.

The screw holes 45 (see also FIG. 7) are formed on the frame body 6b at the positions corresponding to those of the screw holes 37a1 of the support member 37. With the connector 39 supported by the support member 37, after the screws 59b are inserted into the screw holes 37a1 of the support member 37 and the screw holes 45 (first screw holes) of the frame body 6b and the screws 59b, the support member 37 and the frame body 6b are fastened to each other. As a result, the connector 39 is fixed to the main body 3 via the support member 37. The number of screws 59b attached to the screw holes 37a1 and the screw holes 45 may be appropriately selected according to the strength required by the product.

The connector 39 is electrically connected via the cable 38 to the controlling portion 70 which is a control board provided on the backside of the main body 3. As a result, the device connected to the USB port 39a of the connector 39 is electrically connected with the controlling portion 70.

As shown in FIG. 5, when the exterior covers 40a, 40b and 40c are attached with the connector 39 fixed to the outer position, the USB port 39a is exposed from the exterior cover 40c although the connector 39 is mostly covered by the outer cover 40c. This is because the opening 56 is formed on the exterior cover 40c at the position corresponding to the USB port 39a.

When a user inserts the USB memory 58 into the USB port 39a exposed from the exterior cover 40c, the image data stored in the USB memory 58 may be taken into the main body 3. An image may be formed by the image forming apparatus A based on the image data taken from the USB memory 58 in accordance with a user's instruction.

<IC Card Reader>

The IC card reader 61 may be optionally attached to the image forming apparatus A. The IC card reader 61 is used for electromagnetically reading user's IC card information to perform personal authentication by reading the user's IC card information. The IC card information read by the IC card reader 61 is input to the controlling portion 70 after being processed by an IC card reader controlling portion (not shown).

The IC card reader 61 is not frequently removed unlike the USB memory 58. Therefore, it is not necessary for the USB port 39a of the connector 39 to be exposed from the exterior cover 40c of the main body 3. Rather, it is preferable to arrange the USB port 39a inside the exterior cover 40c of the main body 3 from a viewpoint of appearance and cable processing. Therefore, when attaching the IC card reader 61 to the image forming apparatus A, the connector 39 that has been used for connecting the USB memory 58 may be used by fixing the connector 39 to an inner position (second position) where the USB port 39a is located inside the exterior cover 38b.

Figure 7:
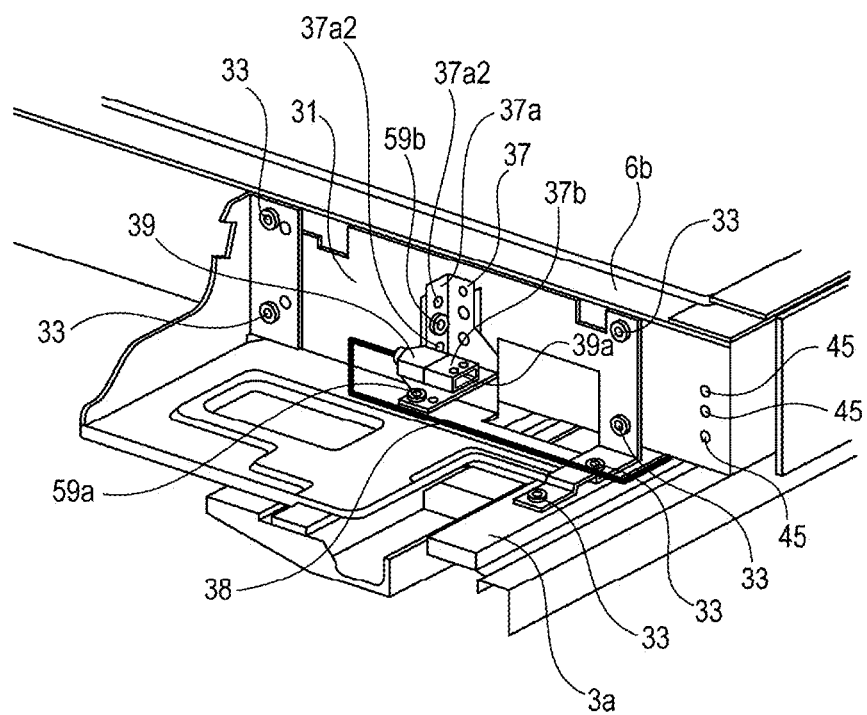
FIG. 7 is a perspective view of the connector and the surrounding thereof when the connector is fixed at an inner position.
Figure 8:
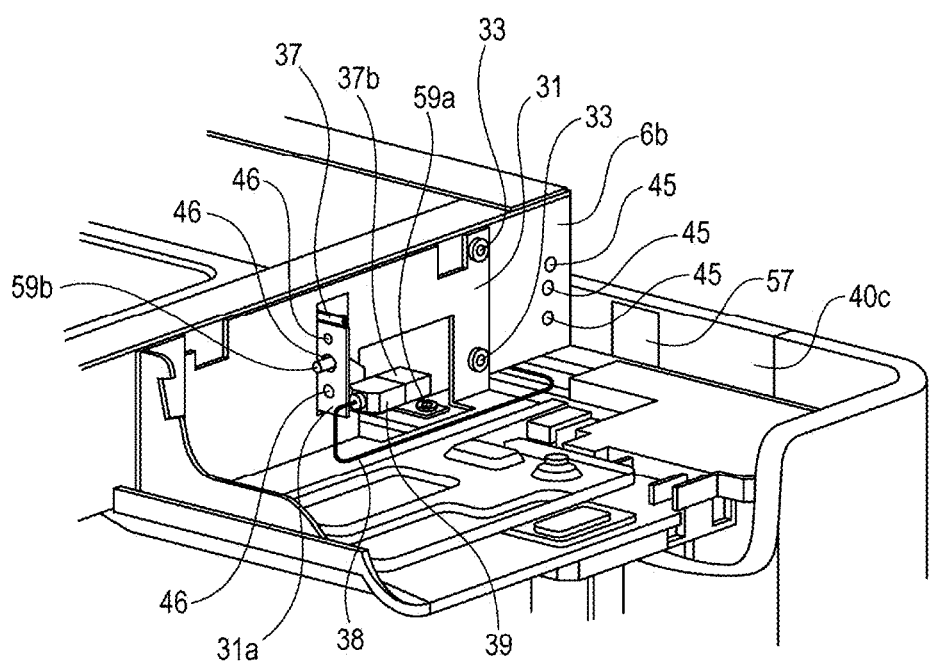
FIG. 8 is a perspective view of the connector and the surrounding thereof when the connector is fixed at an inner position.

FIGS. 7 and 8 are perspective views of the connector 39 and surrounding thereof in the case where the connector 39 is fixed at the inner position. As shown in FIGS. 7 and 8, when the connector 39 is fixed at the inner position, the connector 39 is attached to the fixing base 31 via the support member 37. The fixing base 31 is a substantially L-shaped metal plate, and is fixed to a top surface of the frame body 6b of the image reading device 6 and the stay 3a which is a frame body of the main body 3 by screws 33.

In addition, the fixing base 31 has the bent portion 31a which is bent perpendicular to the frame body 6b. The screw holes 46 (second screw holes) are formed on the bent portion 31a at the positions corresponding to those of the screw holes 37a2 of the support member 37. With the connector 39 supported by the support member 37, after the screws 59b are inserted into the screw holes 37a2 of the support member 37 and the screw holes 46 of the bent portion 31a, the screws 59b, the support member 37 and the bent portion 31a are fastened to each other. As a result, the connector 39 is fixed to the main body 3 via the support member 37. The number of screws 59b attached to the screw holes 37a2 and the screw holes 46 may be appropriately selected according to the strength required by the product.

When the connector 39 is fixed at the inner position of, the opening 56 of the exterior cover 40c is not necessary. Therefore, the closing member 57 is attached to the exterior cover 40c such that the opening 56 of the exterior cover 40c is closed. This prevents dust and the like from entering the inside of the main body 3 through the opening 56.

Figure 9:
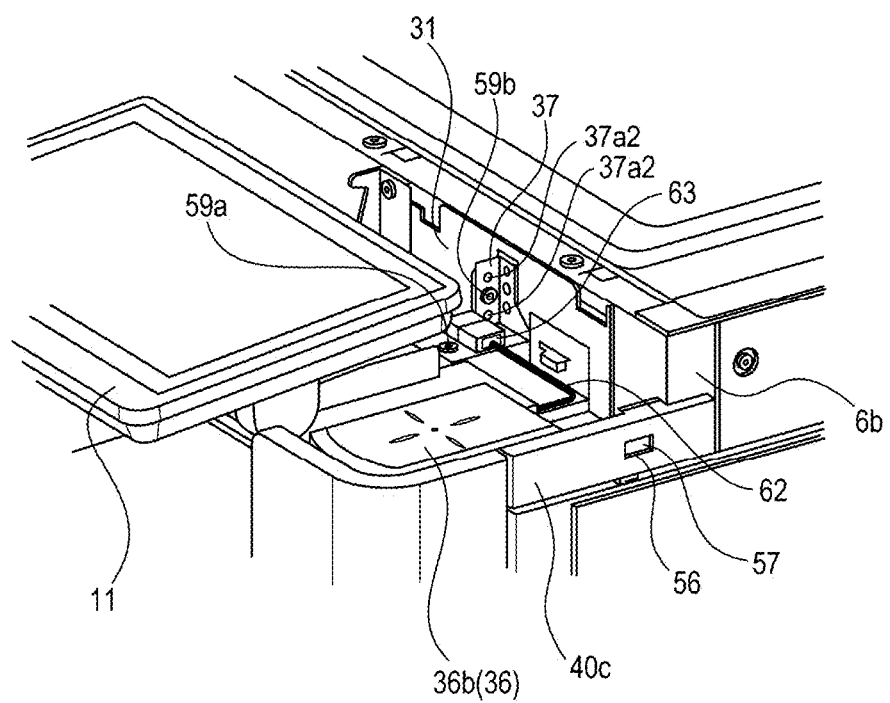
FIG. 9 is a perspective view of the connector and the surrounding thereof when an IC card reader is attached.
Figure 10:
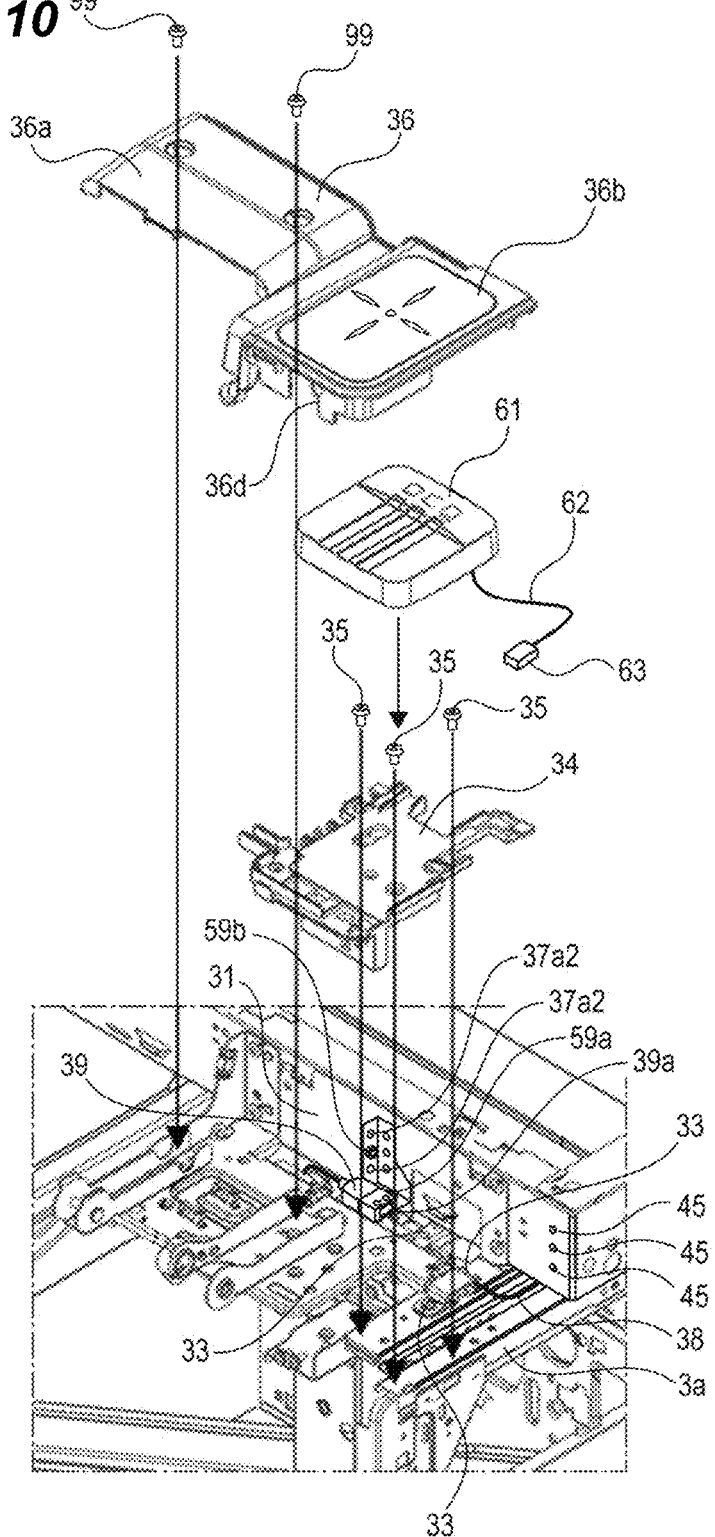
FIG. 10 is an exploded perspective view of an attaching portion of the IC card reader.

FIG. 9 is a perspective view of the connector 39 and the surrounding thereof in the case where the IC card reader 61 is attached. FIG. 10 is an exploded perspective view of an attaching portion of the IC card reader 61. As shown in FIGS. 9 and 10, after the IC card reader 61 has been attached to the main body 3, the USB plug 63 connected to the IC card reader 61 via the cable 62 is connected to the connector 39 of the main body 3. As a result, the electrical connection between the IC card reader 61 and the controlling portion 70 of the main body 3 is established. When the image forming apparatus A is used, the exterior cover 40a is attached from the state shown in FIG. 9 so as to cover the cover portion 36b described later that covers the IC card reader 61.

As described above, according to the configuration of the present embodiment, the position of the connector 39 may be easily changed between the outer position and the inner position only by fastening and removing the screw 59b. Therefore, the IC card reader 61 may be attached by easily reusing the connector 50 that has been provided at the outer position without providing an additional connector, thereby suppressing the manufacturing cost of the image forming apparatus A.

The IC card reader 61 is attached as follows. That is, as shown in FIG. 10, the mounting base 34 is at first fixed on the top surface of the stay 3a by a plurality of screws 35, and the IC card reader 61 is then mounted on the mounting base 34. After that, the cover member 36 having the mounting portion 36a on which the operation portion 11 is to be mounted and the cover portion 36b that covers the IC card reader 61 is fixed to the fixing base 31 with the screws 99. Finally, the connector 39 and the support member 37 are covered with the exterior covers 40a, 40b and 40c. Thus, the IC card reader 61 is attached as described above.

<Numerical Keypad>

The numerical keypad 101 may be optionally attached to the image forming apparatus A according to a user's request. The numerical keypad 101 is attached at the same position as that where the IC card reader 61 is attached. When the numerical keypad 101 is attached, the connector 39 is fixed at the inner position in the manner as described above. Hereinafter, the numerical keypad 101 will be described.

Figure 11:
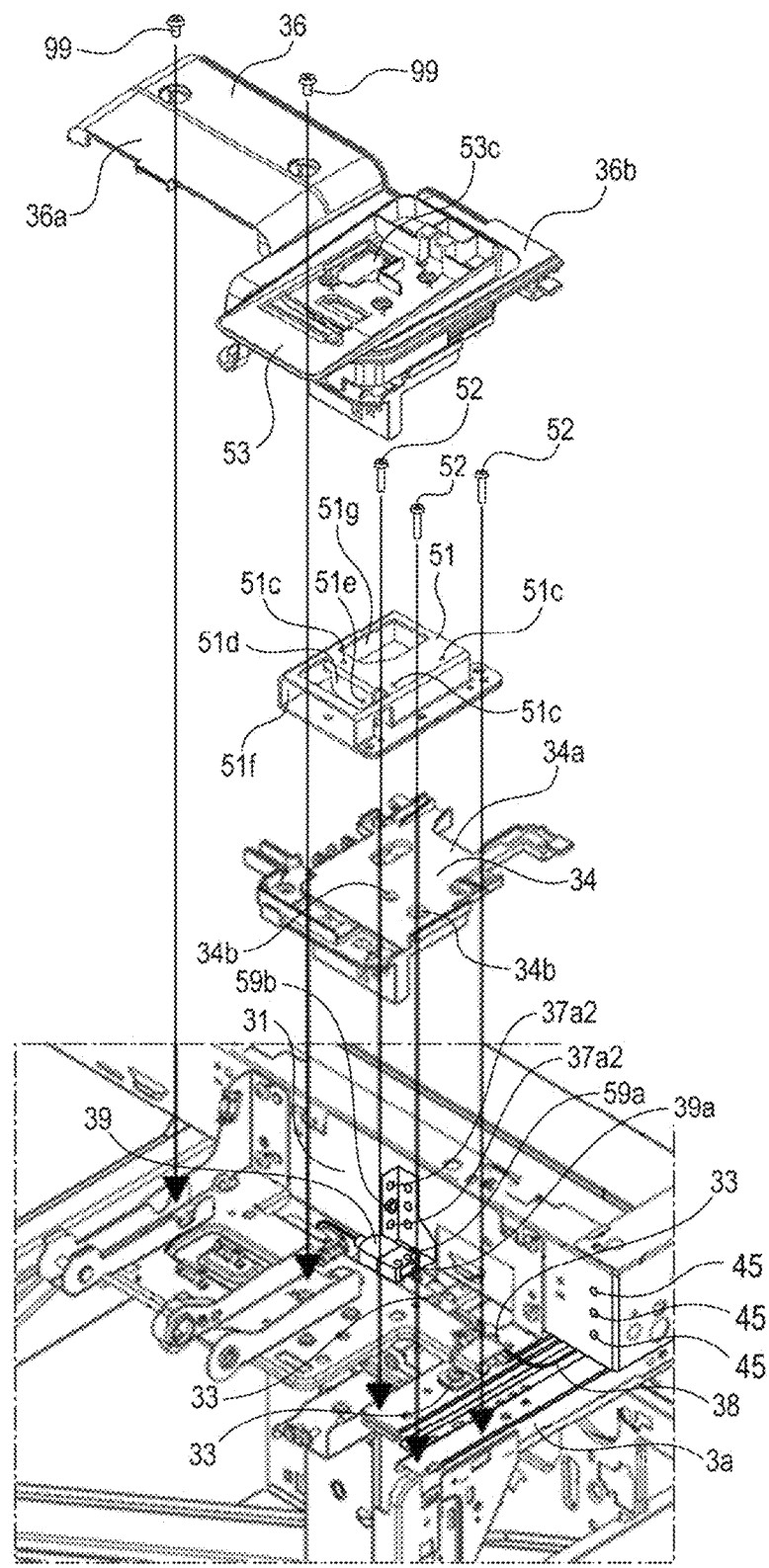
FIG. 11 is an exploded perspective view of an attaching portion of the numerical keypad.
Figure 12:
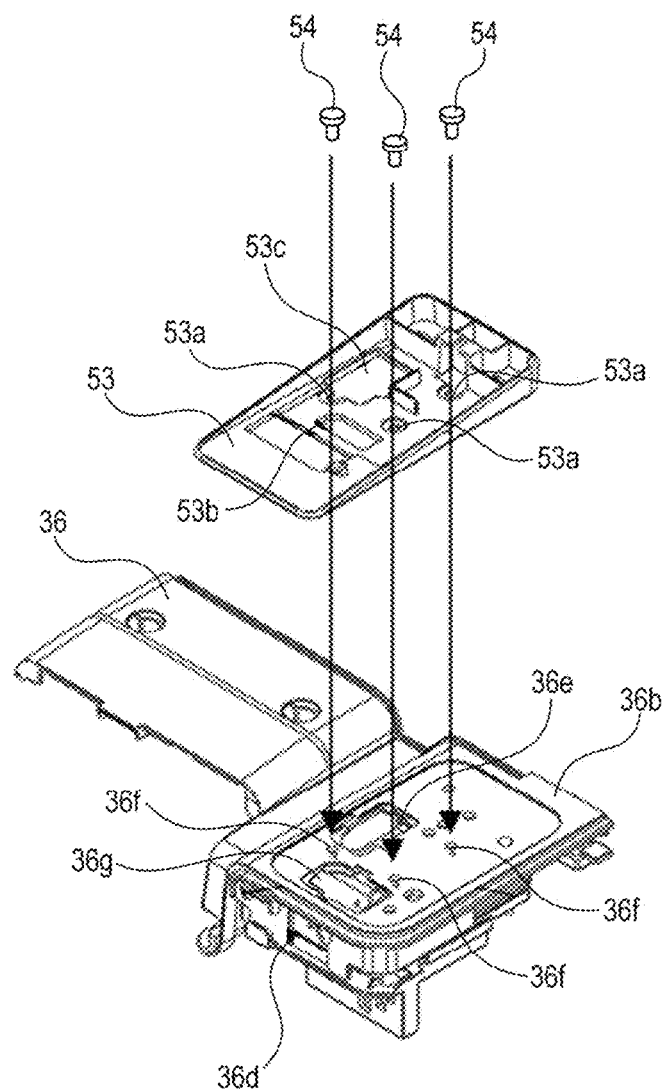
FIG. 12 is an exploded perspective view of a cover member and a numerical keypad lower cover.
Figure 13:
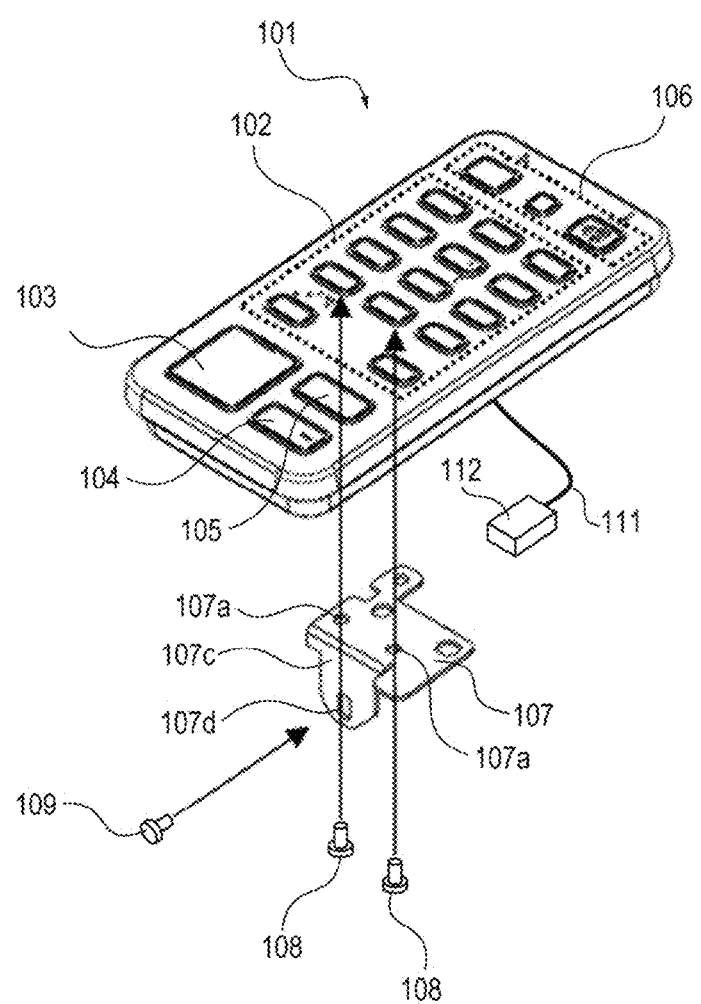
FIG. 13 is an exploded perspective view of the numerical keypad and a fixing member.

FIG. 11 is an exploded perspective view of an attaching portion for the numerical keypad 101. FIG. 12 is an exploded perspective view of the cover member 36 and the numerical keypad lower cover 53. FIG. 13 is an exploded perspective view of the numerical keypad 101 and the fixing member 107.

As shown in FIG. 13, the numerical keypad 101 has numerical keys 102 for inputting numbers and symbols, the start key 103 for starting the image forming apparatus A, and the stop key 104 for stopping the image forming apparatus A, the reset key 105 for resetting input information and the function key 106 for starting other functions. The input information to these keys is processed by a key controlling portion (not shown) and is input to the controlling portion 70 of the main body 3.

As shown in FIG. 11, when the numerical keypad 101 is attached, the numerical keypad support base 51 is fixed to the mounting base 34 by screws 52. The numerical keypad support base 51 is formed by welding two metal plate members which are placed above and below. The numerical keypad support base 51 has the bent portion 51d which is bent downward from the top surface, the top surface opening 51g and the front opening 51f. The screw holes 34b of the mounting base 34 are formed at positions one step lower than that of the mounting surface 34a on which the numerical keypad support base 51 is mounted, which requires the screws 52 which are of long-sized.

Next, the cover member 36 is fixed to the fixing base 31 with the screws 99 in the same manner as when the IC card reader 61 is attached. Next, the numerical keypad lower cover 53 is fixed to the cover member 36 and the numerical keypad support base 51. Then, the numerical keypad 101 is mounted on the numerical keypad lower cover 53. Thereafter, as described in detail later, the numerical keypad 101 is fixed to the main body 3 with the fixing member 107. As a result, the numerical keypad 101 is fixed to the main body 3. Finally, the connectors 39 and the support member 37 are covered by the exterior covers 40b and 40c. The numerical keypad 101 is attached in this manner.

When the numerical keypad 101 is fixed to the main body 3, the USB plug 112 connected to the numerical keypad 101 via the cable 111 is connected to the connector 39 of the main body 3. The USB plug 112 is connected to the connector 39 of the main body 3 through the top surface opening 53c of the numerical keypad lower cover 53, the top surface opening 36e of the cover member 36 and the top surface opening 51g of the numeric key support base 51. As a result, an electrical connection between the numerical keypad 101 and the controlling portion 70 of the main body 3 are established.

As shown in FIG. 12, when the numerical keypad the lower cover 53 is attached to the cover member 36 and the numerical keypad support base 51, the screws 54 are inserted into the screw holes 53a of the numerical keypad lower cover 53, the screw holes 36f of the cover member 36 and the screw holes 51c (see FIG. 11) of the numerical keypad support 51 and fastened. As a result, the numerical keypad lower cover 53 is fixed to the cover member 36 and the numerical keypad support base 51.

As shown in FIG. 13, the screws 108 are inserted into screw holes (not shown) formed on the bottom surface of the numerical keypad 101 and the screw holes 107a formed on the top surface of the fixing member 107 and fastened, so that the numerical keypad 101 and the fixing member 107 are fixed to each other. When the fixing member 107 and the numerical keypad lower cover 53 are fixed, the bent portion 107c bent downward from the top surface of the fixing member 107 passes through the opening 53b of the numerical keypad lower cover 53 and the top surface opening 36g of the cover member 36 and comes into contact with the bent portion 51d of the numerical keypad support base 51. Next, the position of the screw hole 51e of the bent portion 107c of the fixing member 107 and the position of the screw hole 107d of the bent portion 51d of the numerical keypad support base 51 are aligned, and both are fixed by the screw 109. At this time, the screw 109 passes through the front opening 36d of the cover member 36 and the front opening 51f of the numerical keypad support base 51. Thus, the numerical keypad 101 is attached to the main body 3 with the fixing member 107.

Second Embodiment

Next, the configuration of an image forming apparatus according to a second embodiment of the present invention will be described. The same portions as those in the first embodiment are denoted by the same reference numerals, and a description thereof is omitted.

Figure 14:
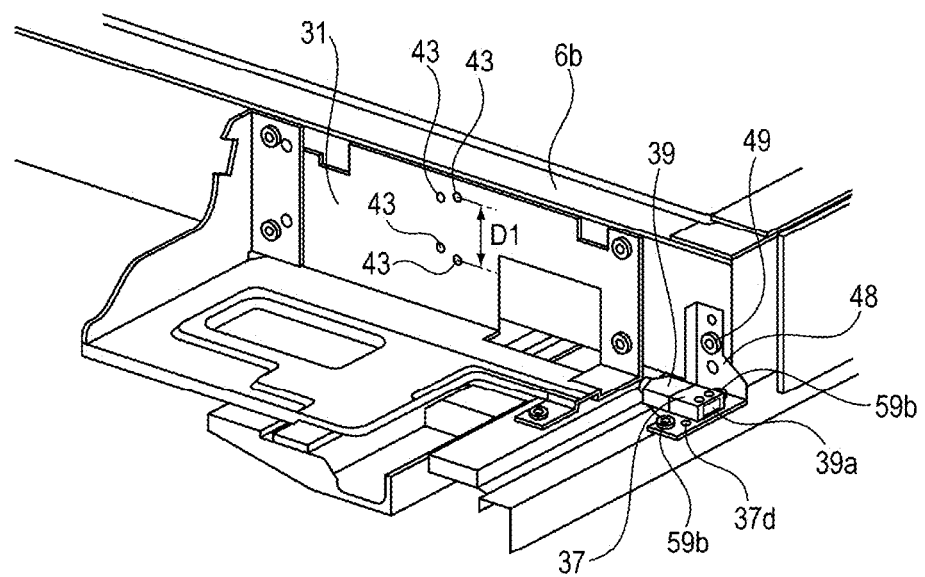
FIG. 14 is a perspective view of the connector and the surrounding thereof when the connector is fixed at an inner position.
Figure 15:
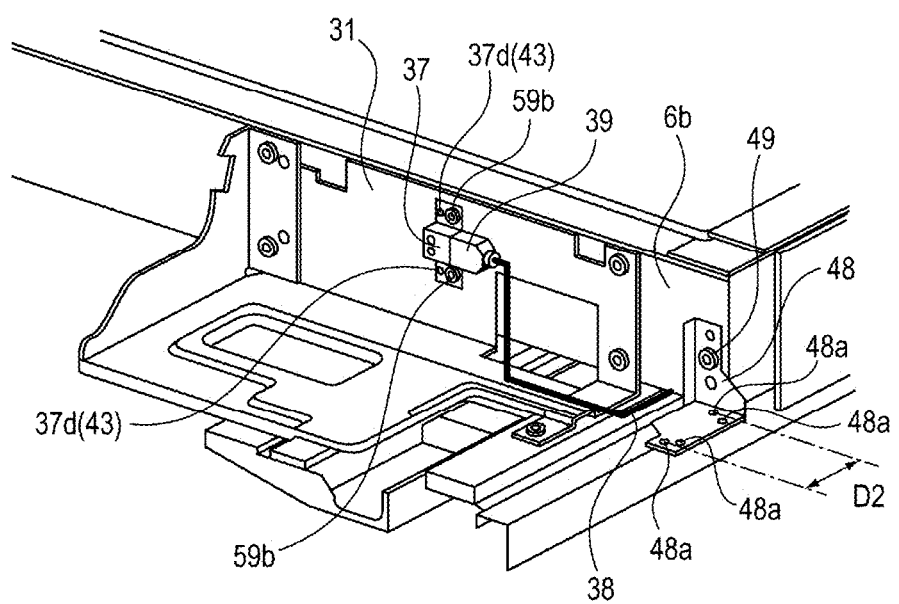
FIG. 15 is a perspective view of the connector and the surrounding thereof when the connector is fixed at an outer position.

FIGS. 14 and 15 are perspective views showing the connector 39 and the surrounding thereof according to the present embodiment. FIG. 14 shows a state where the connector 39 is fixed at the outer position, and FIG. 15 shows a state where the connector 39 is fixed at the inner position.

As shown in FIGS. 14 and 15, the support member 37 according to the present embodiment has only a portion corresponding to the square U-shaped portion 37b of the support member 37 according to the first embodiment. The support member 37 nips the connector 39 and is fixed to the main body 3 with the screws, so that the connector 39 is supported by the support member 37. The screw holes 37d are formed on the support member 37.

When the connector 39 is fixed at the outer position, the connector 39 is fixed to the main body 3 with the support member 37 and the fixing member 48. The fixing member 48 has a plurality of screw holes 48a (first screw holes) at positions corresponding to those of the screw holes 37d of the support member 37. The fixing member 48 is fixed to the frame body 6b of the image reading device 6 with the screw 49.

With the connector 39 being supported by the support member 37, the screws 59b are inserted into the screw holes 37d of the support member 37 and the screw holes 48a of the fixing member 48 and fastened. As a result, the connector 39 is fixed to the main body 3 with the support member 37 and the fixing member 48. The number of screws 59b attached to the screw holes 37d and the screw holes 48a may be appropriately selected according to the strength required by the product.

A plurality of screw holes 43 (second screw holes) are formed on the fixing base 31 at the positions corresponding to the screw holes 37d of the support member 37. The distance D1 between the two screw holes 43 of the fixing base 31 is the same as the distance D2 between the two screw holes 48a of the fixing member 48. When the connector 39 is fixed to the inner position, the screws 59b are inserted into the screw holes 37d of the support member 37 and the screw holes 43 of the fixing base 31 and fastened with the connector 39 supported by the support member 37. As a result, the connector 39 is fixed to the main body 3 with the support member 37 and the fixing member 48. The number of screws 59b attached to the screw holes 37d and the screw holes 43 may be appropriately selected according to the strength required by the product.

As described above, according to the configuration of the present embodiment, the position of the connector 39 may be easily changed between the outer position and the inner position only by fastening and removing the screw 59b similarly to the first embodiment. Therefore, the IC card reader 61 may be attached by easily reusing the connector 50 that has been provided at the outer position without providing an additional connector, thereby suppressing the manufacturing cost of the image forming apparatus A.

Third Embodiment

Next, the configuration of an image forming apparatus according to the third embodiment of the present invention will be described. The same portions as those in the first embodiment or the second embodiments are denoted by the same reference numerals, and a description thereof is omitted.

Figure 16:
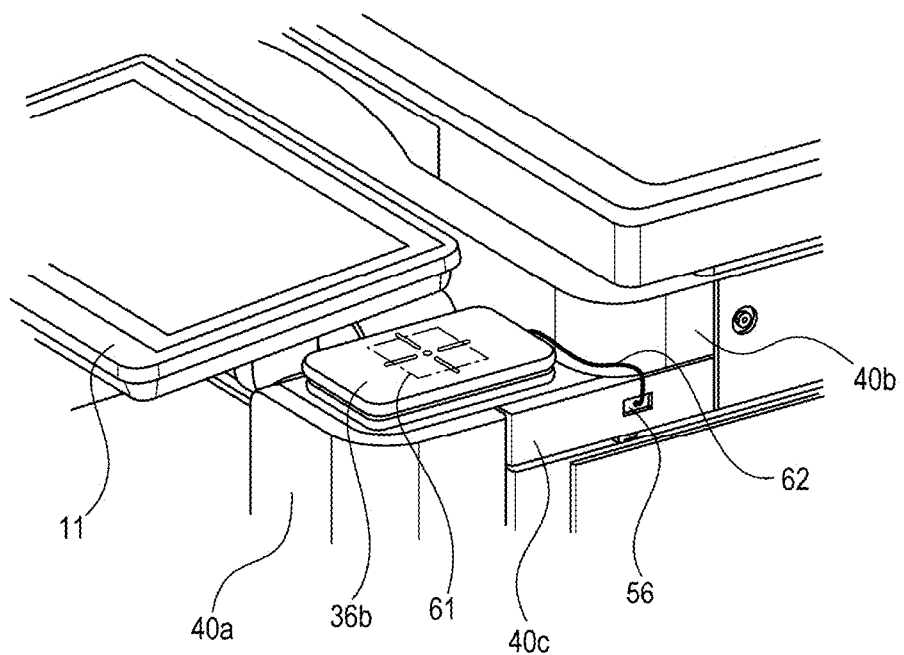
FIG. 16 is a perspective view of an operation portion and the surrounding thereof of the image forming apparatus.

FIG. 16 is a perspective view of the operation unit 11 and the surrounding thereof of the image forming apparatus A according to the present embodiment. As shown in FIG. 16, in the present embodiment, the connector 39 is fixed at the inner position, and the IC card reader 61 is provided so as to be exposed from the exterior cover 40a. The IC card reader 61 is arranged with it is covered with the cover portion 36b.

In this case, after passing the cable 62 for electrically connecting the IC card reader 61 with the connector 39 through the opening 56 of the exterior cover 40c, the USB plug 63 at the end of the cable 62 is connected to the USB port 39a of the connector 39 located at the inner position. As described above, with the configuration of the present embodiment, even when the connector 39 is disposed at the inner position where the connector 39 is not exposed from the exterior cover 40 of the main body 3, the IC card reader 61 may be freely disposed outside the main body 3 and may be used.

In the first to third embodiments, the connector 39 having the USB port 39a to which the USB memory 58 can be connected has been described as an example, but the present invention is not limited to this. Namely, the connector 39 may have a connection portion to which a storage device or the like other than the USB memory 58 may be connected, and the IC card reader 61 and the numerical keypad 101 that may be connected to this connection portion may be attached to the main body 3. With this configuration, the same effect may be obtained. Further, the same effects as described above may also be obtained by the configuration in which electronic devices other than the IC card reader 61 and the numerical keypad 101 are attached to the main body 3.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2019-077617, filed Apr. 16, 2019, which is hereby incorporated by reference herein in its entirety.

What is claimed is:

1. An image forming apparatus comprising:
   a connector including a connecting portion for connecting to a device equipped with a USB plug;
   a support member configured to support the connector, the support member including a screw hole;
   a first screw hole provided on a main body of the image forming apparatus and corresponding to the screw hole of the support member, the first screw hole being configured to fix the connector at a first position where the connecting portion is exposed on an exterior of the main body such that a USB memory that is inserted from outside of the exterior of the main body can connect to the connecting portion; and
   a second screw hole provided on the main body and corresponding to the screw hole of the support member, the second screw hole being configured to fix the connector at a second position where the connecting portion is connectable to the USB plug of the device to be attached to the image forming apparatus inside of the exterior of the main body.

2. The image forming apparatus according to claim 1, wherein an opening portion is formed on the exterior of the main body at a position corresponding to that of the connecting portion of the connector located at the first position, and
   wherein the opening portion is closed by a closing member when the connector is fixed at the second position.

3. The image forming apparatus according to claim 1, further comprising an IC card reader with a USB plug,
   wherein the USB plug of the IC card reader is connected to the connecting portion of the connector when the connector is fixed at the second position.

4. The image forming apparatus according to claim 1, further comprising a numerical keypad with a USB plug,
   wherein the USB plug of the numerical keypad is connected to the connecting portion of the connector when the connector is fixed at the second position.

5. The image forming apparatus according to claim 1, wherein the support member includes further screw holes,
   wherein the main body of the image forming apparatus further comprises:
      a third screw hole that is provided on the main body with one of the further screw holes and is configured to fix the connector at the first position with the first screw hole, and
      a fourth screw hole that is provided on the main body and is configured to fix the connector at the second position with the second screw hole,
   wherein a distance between the first screw hole and the third screw hole is equal to a distance between the second screw hole and the fourth screw hole.

6. The image forming apparatus according to claim 1, further comprising a control board disposed at backside of the image forming apparatus,
   wherein the connector is provided on a front side in a front-rear direction of the image forming apparatus and connected with the control board.

* * * * *